Figure 1:
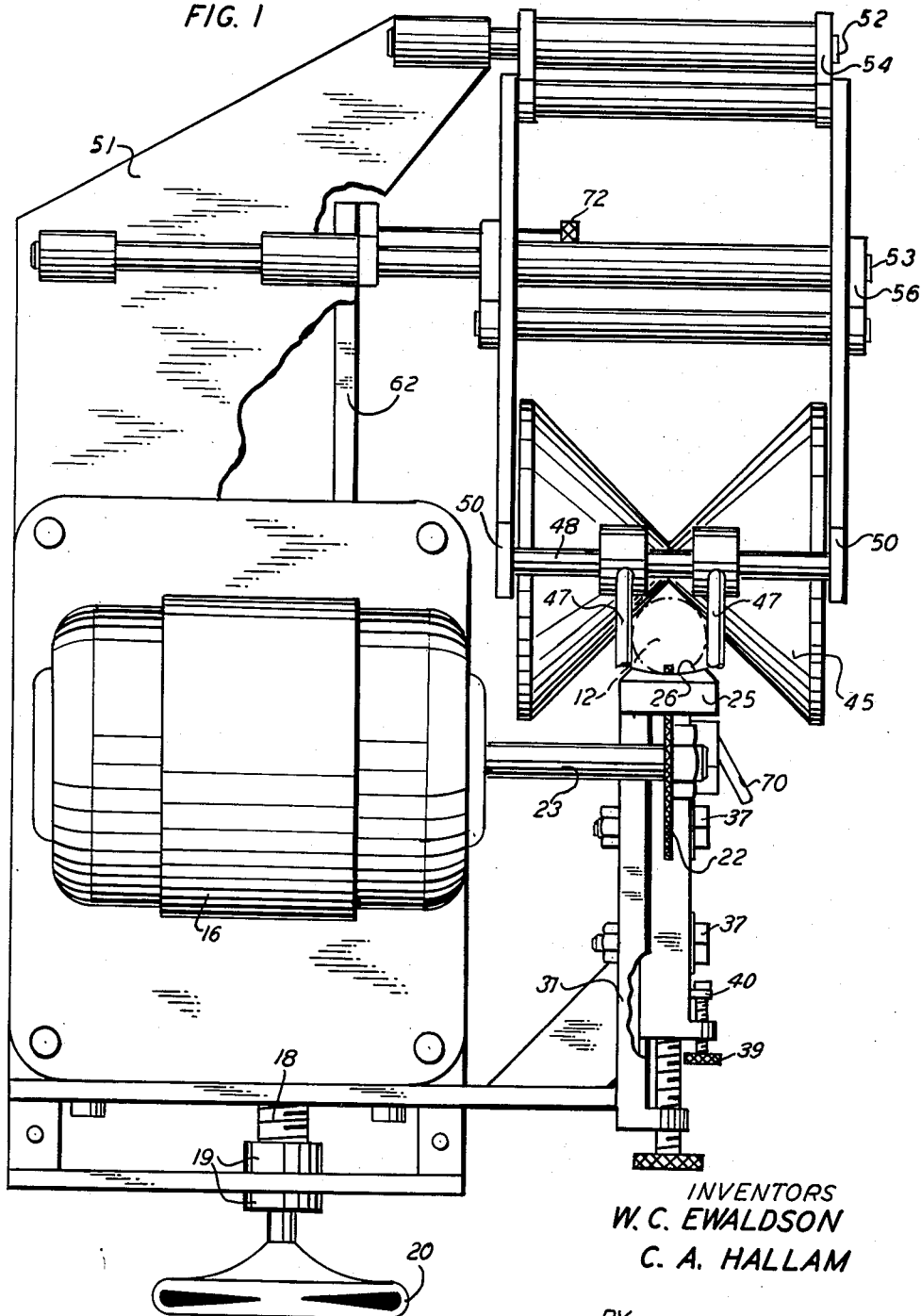

April 3, 1956 — W. C. EWALDSON ET AL — 2,740,473
CABLE SHEATH CUTTING APPARATUS
Filed Oct. 9, 1951 — 3 Sheets-Sheet 1

INVENTORS
W. C. EWALDSON
C. A. HALLAM
BY
*[signature]*
ATTORNEY

April 3, 1956    W. C. EWALDSON ET AL    2,740,473
CABLE SHEATH CUTTING APPARATUS Filed Oct. 9, 1951    3 Sheets-Sheet 2

INVENTORS
W. C. EWALDSON
C. A. HALLAM

BY *W.C. Parnell*
ATTORNEY

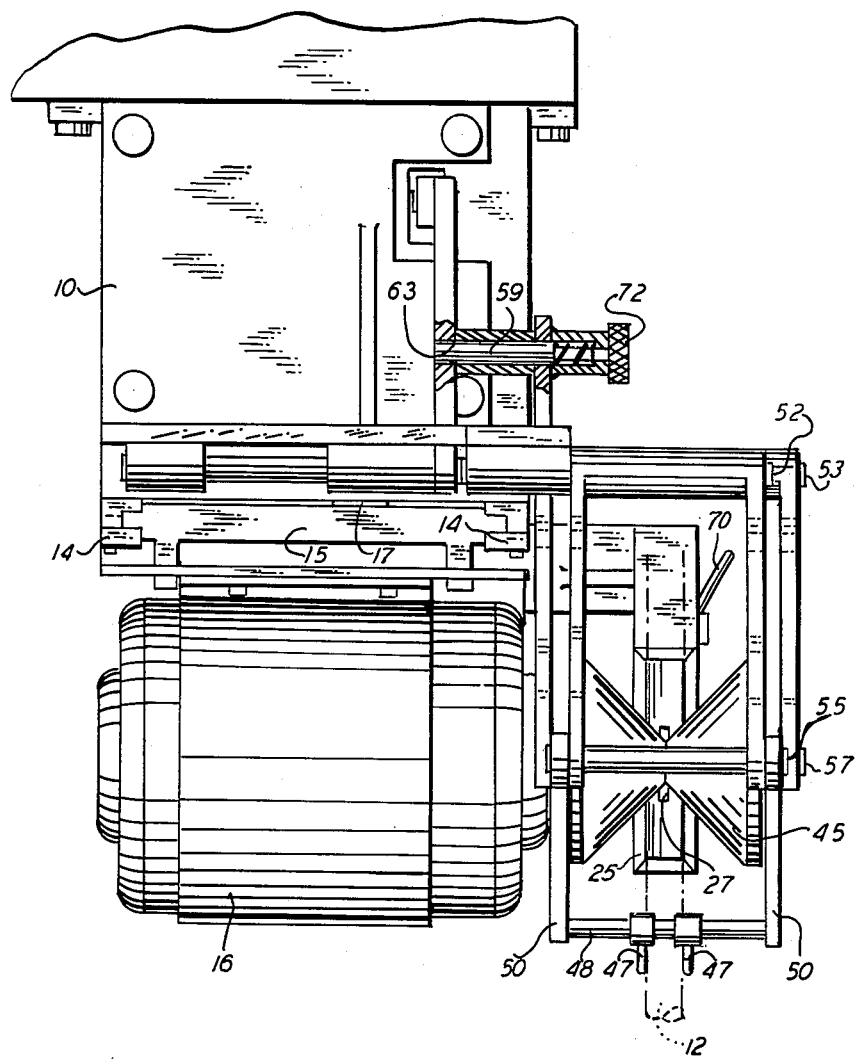

United States Patent Office 2,740,473
Patented Apr. 3, 1956

2,740,473

CABLE SHEATH CUTTING APPARATUS

Waldemar C. Ewaldson, Millington, and Cecil A. Hallam, Westfield, N. J., assignors to Western Electric Company, Incorporated, New York, N. Y., a corporation of New York Application October 9, 1951, Serial No. 250,412

5 Claims. (Cl. 164—60)

This invention relates to apparatus for cutting sheath material of cables and has for its object, the provision of an apparatus which is simple in structure and highly variable to accurately cut sheath material of different thicknesses from electrical telephone cables of various sizes.

Telephone cables, in most instances, are composed of a core of a selected number of units of insulated electrical conductors twisted together, covered with spiral wrappings of paper and a sheath of material. To salvage the materials from electrical cables, one of the important steps is the removal of the sheath material therefrom. Frequently the entire cable core may be salvaged and provided with a new sheath providing the old sheath may be removed without damaging the wires of the cable core or the insulation thereon. This is possible if the means for cutting the sheath material is controlled accurately limiting the depth of the cut so that it may extend through the sheath material, but not to a point where it will disturb the wires or the insulation thereon. The thickness of the sheath material usually varies with variations in the sizes of cables and due to this variation in thickness, means controlling the travel of the cable relative to a cutter must be exceedingly accurate in its adjustment.

In accordance with the aforementioned object, the invention comprises an apparatus for cutting sheath material of cables of various sizes while advanced longitudinally, the apparatus including a support for a motor driven rotatable cutter, with means to move the support and cutter relative to the path of the cable and also relative to guide means controlling the path of the cable. One of the important features of the invention includes a connecting means between the guide and the support whereby movement of the support a given distance in one direction will move the guide a substantially like distance in the opposite direction to maintain the center line of the path for cables of various sizes constant.

A slotted table positioned adjacent the cutter and pivotally carried by the support, serves as a support for the cable and through adjustable means, the table may be moved relative to the cutter to determine the depth of the cut comparable to the thickness of the sheath material. During initial threading of the cable through the apparatus, the table may be moved out of its normal position to guide the cable free of the cutter.

Figure 2:
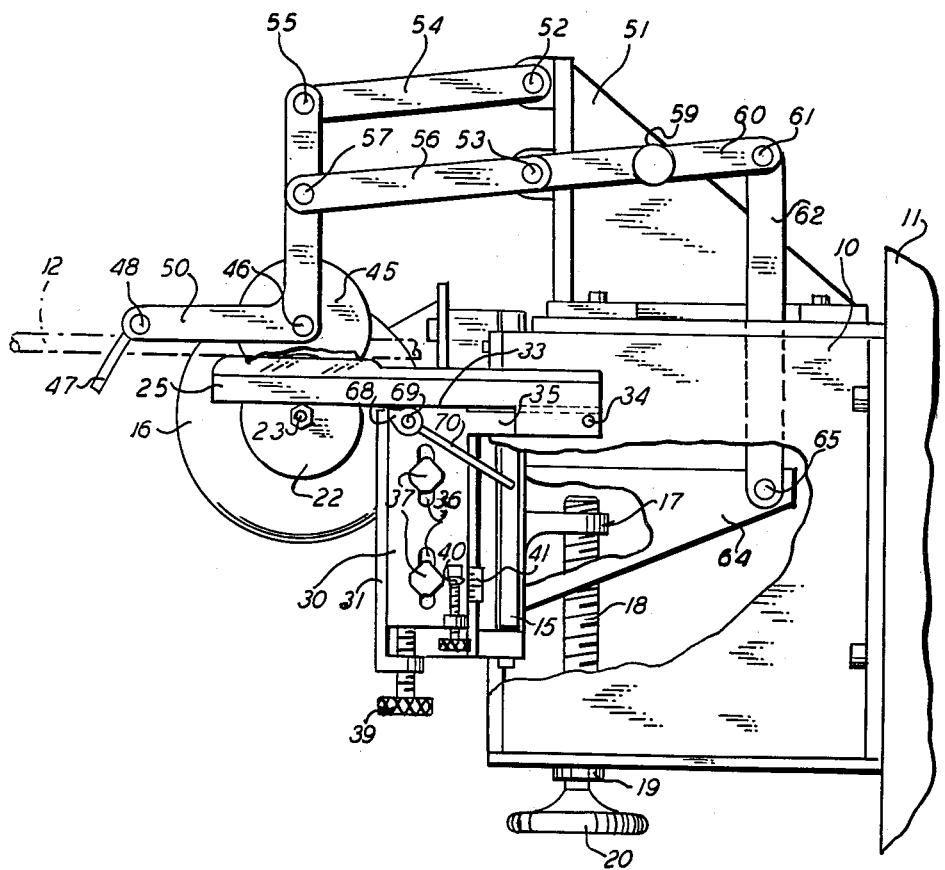

Other objects and advantages will be apparent from the following detailed description when considered in conjunction with the accompanying drawings wherein:

Fig. 1 is a side elevational view of the apparatus;
Fig. 2 is a front elevational view of the apparatus; and
Fig. 3 is a top plan view of the apparatus.

Referring now to the drawings, the apparatus shown therein includes a frame 10 mounted on a suitable support 11 which may be fixed or portable, as desired, for positioning the apparatus relative to a cable supplying mechanism. In the present embodiment of the invention, the apparatus is to be positioned between a supply unit and a take-up unit of a cable re-winding mechanism whereby the cable from a supply reel may be advanced longitudinally to a take-up reel to advance a cable 12 longitudinally. The cable 12 may be of any of the conventional sizes with a sheath formed of any of the many types of protective materials and of varying thickness with variations in the size of the cable.

The frame 10 has parallel guides 14 mounted on a vertical surface thereof to receive an adjustable carriage 15 for an electric motor 16. The carriage 15 has an integral projection 17, Fig. 2, extending into the frame 10 where it is provided with a threaded aperture to receive an adjusting screw 18. The adjusting screw 18 is supported at 19 for rotation through the aid of a handwheel 20 but held against axial movement. Through rotation of the screw 18 the carriage 15 may be moved in its guides 14 to move the motor 16 relative to the path of the cable 12.

A cutter 22 mounted on the shaft 23 of the motor 16 is positioned relative to the path of the cable 12. A table 25 having an arcuate upper surface 26 is provided with a longitudinal aperture 27 for the cutter 22. A member 30 is adjustable vertically in a flanged guide 31 in the form of a bracket mounted on the frame 10 at a position beneath the path of the cable 12. The table 25 normally rests on an upper surface 33 of the member 30 and has one end pivoted at 34 to an arm 35 of the member. Elongate apertures 36 in the member 30 receive screws 37 entering threaded apertures of the bracket 31 to allow movement of the member when the screws 37 are loosened, but to normally hold the member in a selected position to support the table 25 at a given position, depending upon the thickness of the sheath on the cable. The member 30 may be moved through the aid of a thumb screw 39 carried in a threaded aperture of a portion of the bracket 31 and positioned to engage the lower surface of the member. The member 30 may be moved measured distances through the aid of an adjustable pointer 40 supported by the member 30 and movable relative to a gage element 41 fixed to the bracket 31.

The guide means for the cable includes a V-grooved roller 45 rotatably supported at 46, and parallel fingers 47 adjustably mounted on a rod 48. The rod 48 is supported at like ends of parallel L-shaped members 50 while the spindle 46 for the roller 45 has its ends supported at the junctions of the lateral and vertical portions of the L-shaped members 50. A bracket 51 is mounted on the frame 10 to support pivots 52 and 53. A link member 54 extends from a pivot 55 at the top of the L-shaped members 50 and the pivot 52. Similar links 56 extend between the pivot 53 and a pivot 57 of the L-shaped members 50 so that the links 54 and 56 will be parallel at all times. One of the links 56 extends to the right beyond the pivot 53 where it is provided with a spring pressed plunger 59 shown in detail in Fig. 3. Another link 60 pivoted at one end at 53 and at the other end at 61 to the upper end of a vertical link 62, has an aperture 63 therein to receive the plunger 59 forming a positive connection between the guide mechanism and a linkage connecting it to the carriage 15 whereby adjustment of the carriage may bring about like adjustment of the guide mechanism. This is made possible through the connection of the link 62 at 65 with a bracket 64 secured to the carriage 15.

A cam 68, rotatably supported at 69, is positioned beneath the table 25 and movable through the aid of a handle 70 to move the table about its pivot 34 during the initial threading of the cable 12 through the apparatus free of contact with the cutter 22. Furthermore, a knurled handle 72 is mounted on the outer end of the spring pressed plunger 59 by the aid of which the operator may readily remove the plunger.

Considering now the operation of the apparatus, let it be assumed that the apparatus is set for a cable of a given size. The cable in traveling longitudinally will ride on the table 25 and be held centrally thereon through the aid of the fingers 47 and the roller 45, whereby the cutter will cut a straight slot in the cable extending only through the sheath thereof. This operation continues until the entire cable has travelled through the apparatus.

If the next cable is larger in diameter than the previous cable, certain adjustments will be made to accommodate this cable. First, the handle 72 of the plunger 59 will be gripped by the operator to remove the plunger 59 from the aperture 63 whereby the guiding mechanism may be moved upwardly out of the path of the cable. The diameter of the cable being known, the adjusting screw 18 may be actuated to lower the carriage 15 with the motor 16 and cutter 22 a given distance. Furthermore, the table 25 is adjusted about its pivot 34 subsequent to the loosening of the screws 37 to move the pointer 40 relative to the gage member 41 so that the controlling or supporting surface of the table will be beneath the periphery of the cutter, a distance equal to the thickness of the sheath material on the cable. Actually there are two steps which are followed in adjusting the table. The thumb screw 39 is rotated to lower the member 30 and thereby cause the table 25 resting on the surface 33 thereof to move downwardly with its pivot 34 until the periphery of the cutter is even with the adjacent surface of the table. The pointer 40 is moved relative to the scale 41 from a zero position to a distance or indication on the scale equal to the thickness of the next sheath to be cut after which the thumb screw 39 is moved to move the member 30 with the table 25 that additional measured distance until the pointer returns to its zero position and the periphery of the cutter is that measured distance above the adjacent surface of the table.

After these adjustments have been made, the table 25 may be moved free of the cutter 22 during the initial threading of the cable through the apparatus so that the cable will not be damaged by, or damage, the cutter. When the cable has been threaded through the apparatus, the guiding mechanism may be moved into position and latched in place by the plunger 59 entering the aperture 63. Although the guiding mechanism was not referred to during the description of the adjustment of the carriage 15, it will be apparent that through its connection with its carriage, any adjustment of the carriage to move the cutter relative to the center line of the cable, will bring about a substantially like adjustment of the guiding means. In other words, movement of the carriage with the cutter downwardly a given distance, will cause downward movement of the link 62 to move its connecting mechanism about the pivots 52—53 and 55—57 to bring about like adjustment or a similar upward movement of the roller 45 with its guide pins 47. Through this adjusting mechanism, the center line of each cable, regardless of its size, will be constant with the center lines of all other cables passing through the apparatus, and the table 25 need be adjusted only with variations in the thicknesses of the sheath materials.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for cutting sheath material of cables of various sizes while advanced longitudinally, the apparatus comprising a support disposed adjacent a centerline for the paths of the cables of various sizes, a motor driven rotatable cutter, a movable carriage therefor, disposed on the support, guide means mounted on the support for movement varied distances relative to the cutter for cables of various sizes to position the cables singly with respect to the cutter and centerline, means to move the carriage with the motor driven cutter relative to the centerline and the guide means to compensate for cables of various sizes, means connecting the guide means to the carriage to cause movement of the guide means a given distance in one direction from the centerline during movement of the carriage substantially a like distance in the opposite direction from the centerline for the cables of various sizes, and a table slotted for the cutter to extend therethrough, carried by the support and movable relative to the cutter to support the cables of various sizes singly.

2. An apparatus for cutting sheath material of cables of various sizes while advanced longitudinally, the apparatus comprising a support disposed adjacent a centerline for the paths of the cables of various sizes, a motor driven rotatable cutter, a movable carriage therefor, disposed on the support, guide means mounted on the support for movement varied distances relative to the cutter for cables of various sizes to position the cables singly with respect to the cutter and centerline, means to move the carriage with the motor driven cutter relative to the centerline and the guide means to compensate for cables of various sizes, means connecting the guide means to the carriage to cause movement of the guide means a given distance in one direction from the centerline during movement of the carriage substantially a like distance in the opposite direction from the centerline for the cables of various sizes, a table slotted for the cutter to extend therethrough, carried by the support and movable relative to the cutter to support the cables of various sizes singly, and means operable to open the connection between the guide means and the carriage to free the guide means for movement away from the centerline during initial threading of cable through the apparatus.

3. An apparatus for cutting sheath material of cables of various sizes while advanced longitudinally, the apparatus comprising a support disposed adjacent a centerline for the paths of the cables of various sizes, a motor driven rotatable cutter, a movable carriage therefor, disposed on the support, guide means mounted on the support for movement varied distances relative to the cutter for cables of various sizes to position the cables singly with respect to the cutter and centerline, means to move the carriage with the motor driven cutter relative to the centerline and the guide means to compensate for cables of various sizes, means connecting the guide means to the carriage to cause movement of the guide means a given distance in one direction from the centerline during movement of the carriage substantially a like distance in the opposite direction from the centerline for the cables of various sizes, a table slotted for the cutter to extend therethrough, carried by the support and movable relative to the cutter to support the cables of various sizes singly, means operable to open the connection between the guide means and the carirage to free the guide means for movement away from the centerline during initial threading of cable through the apparatus, and means to move the table to a position relative to the cutter to support the cable for sliding movement thereon free of the cutter during initial threading of the cable.

4. An apparatus for cutting sheath material of cables of various sizes while advanced longitudinally, the apparatus comprising a support disposed adjacent a centerline for the paths of the cables of various sizes, a motor driven rotatable cutter, a movable carirage therefor, disposed on the support, guide means mounted on the support for movement varied distances relative to the cutter for cables of various sizes to position the cables singly with respect to the cutter and centerline, means to move the carriage with the motor driven cutter relative to the centerline and the guide means to compensate for cables of various sizes, means connecting the guide means to the carriage to cause movement of the guide means a given distance in one direction from the centerline during movement of the carriage substantially a like distance in the opposite direction from the centerline for the cables of various sizes, a table having a surface to support the cables of various sizes singly during longitudinal advancement thereof, the table having an aperture in said surface for the cutter to extend therethrough, a member to support the table carried by the support and movable relative to the support and the cutter, means actuable to move the member to move the table until the surface thereof is adjacent the periphery of the cutter, and means to measure an aditional movement of the member by said means to move the surface of the table an additional distance equal to the thickness of the sheath to be cut.

5. An apparatus for cutting sheath material of cables of various sizes while advanced longitudinally, the apparatus comprising a support disposed adjacent a centerline for the paths of the cables of various sizes, a motor driven rotatable cutter, a movable carriage therefor, disposed on the support, guide means mounted on the support for movement varied distances relative to the cutter for cables of various sizes to position the cables singly with respect to the cutter and centerline, means to move the carriage with the motor driven cutter relative to the centerline and the guide means to compensate for cables of various sizes, means connecting the guide means to the carriage to cause movement of the guide means a given distance in one direction from the centerline during movement of the carriage substantially a like distance in the opposite direction from the centerline for the cables of various sizes, a table having a surface to support the cables of various sizes singly during longitudinal advancement thereof, the table having an aperture in said surface for the cutter to extend therethrough, a member to support the table carried by the support and movable relative to the support and the cutter, means actuable to move the member to move the table until the surface thereof is adjacent the periphery of the cutter, means to measure an additional movement of the member by said means to move the surface of the table an additional distance equal to the thickness of the sheath to be cut, a pivotal connection between the member and the table, and means to move the table about the pivot to move the surface beyond the periphery of the cutter to support the cables singly free of the cutter during initial threading thereof through the apparatus.

References Cited in the file of this patent

UNITED STATES PATENTS

| | | |
|---|---|---|
| 76,947 | Sanborn | Apr. 21, 1868 |
| 1,656,755 | Palmer | Jan. 17, 1928 |
| 1,675,247 | Brust | June 26, 1928 |
| 1,854,131 | Gebhardt et al. | Apr. 12, 1932 |
| 2,413,192 | Pope | Dec. 24, 1946 |
| 2,559,387 | Baker | July 3, 1951 |

FOREIGN PATENTS

| | | |
|---|---|---|
| 111,218 | Germany | June 9, 1900 |